(12) United States Patent
Karloff

(10) Patent No.: US 7,706,286 B2
(45) Date of Patent: Apr. 27, 2010

(54) METHOD FOR SELECTING NODES IN A NETWORK

(76) Inventor: Howard Karloff, 310 W. 85th St., Apt. 9A, New York, NY (US) 10024

( * ) Notice: Subject to any disclaimer, the term of this patent is extended or adjusted under 35 U.S.C. 154(b) by 62 days.

(21) Appl. No.: 12/217,705

(22) Filed: Jul. 8, 2008

(65) Prior Publication Data
US 2010/0008368 A1    Jan. 14, 2010

(51) Int. Cl.
*G01R 31/08* (2006.01)
(52) U.S. Cl. .................. 370/238; 370/255; 370/256
(58) Field of Classification Search .............. None
See application file for complete search history.

(56) References Cited

U.S. PATENT DOCUMENTS

2006/0104210 A1* 5/2006 Nielsen .................... 370/248

* cited by examiner

*Primary Examiner*—Duc C Ho
(74) *Attorney, Agent, or Firm*—Henry Brendzel

(57) ABSTRACT

Given a set of network nodes B that are sought to be monitored, and a set of potential monitoring nodes, a subset M of the monitoring nodes is chosen that insures monitoring each node b in B with a pair of nodes $m_i$ and $m_j$ such that no node except b is on both any shortest path from b to $m_i$ and on any shortest path from b to $m_j$. Some of the nodes in M are chosen in a first step by identifying a subset of B having nodes b that are "t-good" nodes, choosing a subset of potential monitoring nodes as First Partner nodes, and choosing a corresponding subset of potential monitoring nodes as Second Partner nodes. Others are chosen in a second step that handles nodes b that are not "t-good," using a greedy algorithm.

17 Claims, 2 Drawing Sheets

METHOD FOR SELECTING NODES IN A NETWORK

BACKGROUND

This relates to networks and, more particularly, to selecting a subset of network nodes from a given set of network nodes. It is applicable, for example, to monitoring the behavior of networks.

A data network such as the Internet comprises nodes (e.g., routers) and links that interconnect the nodes. A typical objective of such networks is to establish connections between nodes that utilize the network most effectively, which translates to the objective of choosing a best path from a given originating node of a connection to a given terminating node of the connection. One well known algorithm for choosing a path from an originating node to a terminating node is the Open Shortest Path First (OSPF) algorithm, where each link of the network has an associated cost; a path from node N1 to node N2 is said to have a cost that corresponds to the sum of the costs of the links which form the path, and the algorithm identifies a path that has the lowest cost.

There is a recognized need to know the operational state of the network—such as packet loss rate, packet delay through the routers and links, etc.—and to that end, there is a need to measure the traffic that flows through the various links and nodes. This need exists in the data network as a whole, and also in sub-networks of the data network, such as virtual private networks within a data network.

Whether it is the entire network or a sub-network, the situation typically is the same: an administrator desires to monitor a specific set of nodes (herein referred to as branch nodes) and is able to perform this monitoring through equipment or modules that the administrator is able to install in any of a given set of network nodes (herein referred to as potential monitoring nodes). The branch nodes and the potential monitoring nodes may or may not be disjoint; meaning that one or more of the potential monitoring nodes may also be branch nodes.

It would be beneficial to be able to choose a small set of nodes from among the set of potential monitoring nodes as the actual monitoring nodes.

SUMMARY

An improvement in the art is realized with a method that, in general, identifies a subset of nodes from a given set of nodes; that subset satisfies a requirement related to disjointness of shortest paths to nodes in another given set of nodes. In connection with a network monitoring embodiment, the disclosed method, for each branch node, chooses a pair of nodes that are reached by the branch node by disjoint paths. For the set of branch nodes, the method chooses a set of monitoring nodes from the set of potential monitoring nodes such that each branch node can be monitored by at least two monitoring nodes and, moreover, that the nodes that are chosen to monitor a branch node monitor that node through paths from the branch node that are node disjoint (except for the branch node). That is, given a set B of branch nodes b, and a set of potential monitoring nodes, a subset M of the monitoring nodes is chosen from among the potential monitoring nodes that insures monitoring each of the nodes b in B with a pair of disjoint paths, and each such path terminates at one of the monitoring nodes in M. However, branch nodes that are also potential monitoring nodes may monitor themselves, and in such circumstances the branch node that is also a monitoring node does not require a pair of monitoring nodes.

Some of the potential monitoring nodes are chosen to be included in M in a first step, by identifying a subset of the branch nodes that are "t-good" nodes (defined hereinafter), and choosing for those "t-good" branch nodes a subset of the potential monitoring nodes as First Partner (FP) nodes. In a second step, another subset of the potential monitoring nodes is chosen to be included in M as Second Partner (SP) nodes for those branch nodes, thereby providing the necessary monitoring means for those branch nodes. In a third step, other nodes are chosen to be included in M, using a greedy algorithm, to handle the branch nodes that are not "t-good." Optionally, a "minimalization" step is included to reduce the set of nodes chosen in the above-mentioned three steps.

DETAILED DESCRIPTION

Figure 1:
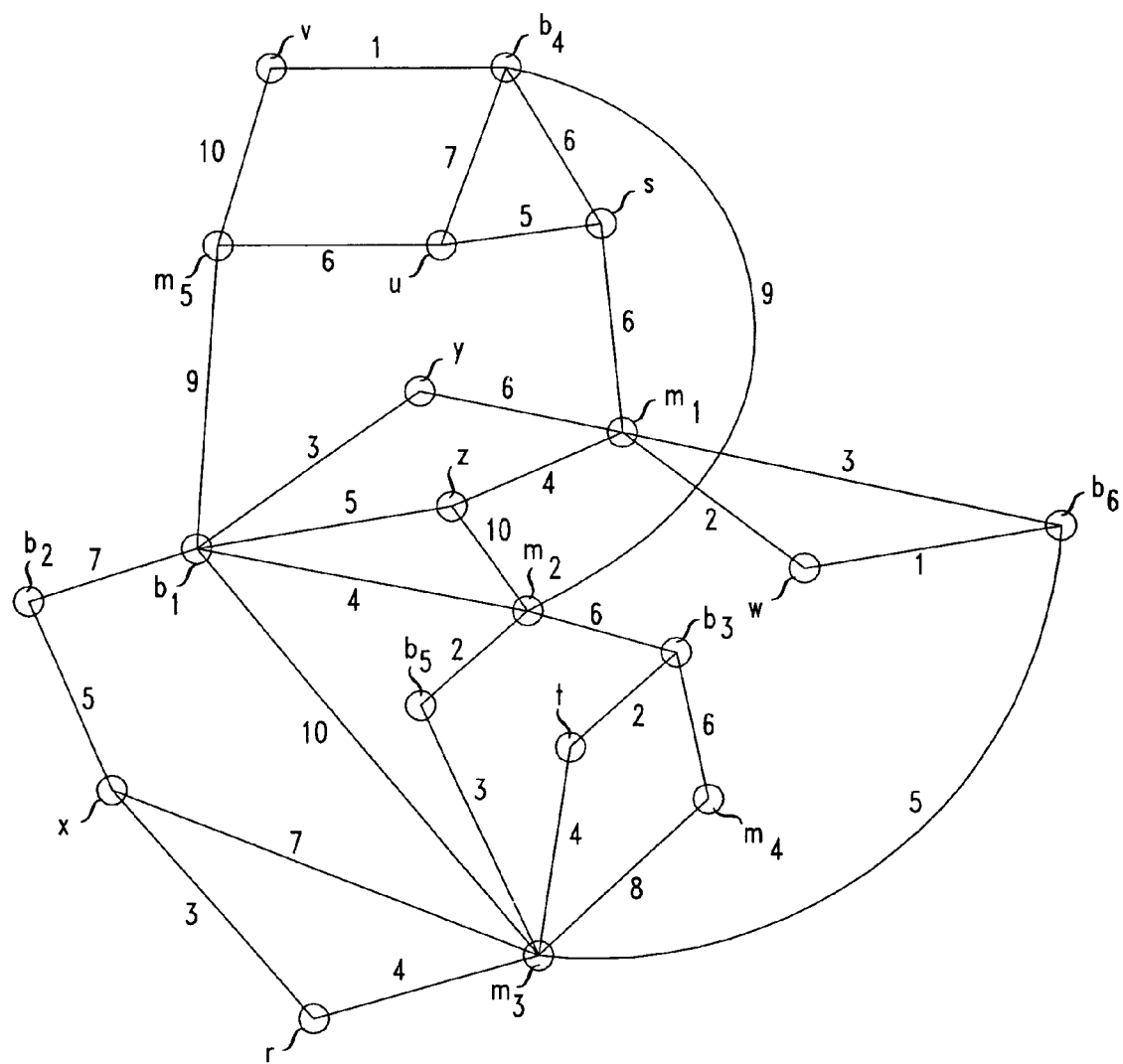
FIG. 1 presents an illustrative network.

FIG. 1 shows a network of nodes and links that interconnect the nodes. The nodes of at least a subset of the FIG. 1 network nodes are the branch nodes, b, and FIG. 1 illustratively has nodes $b_1$ through $b_6$. Another subset of the FIG. 1 network nodes are nodes m, which are the potential monitoring nodes, and FIG. 1 has nodes $m_1$ through $m_5$. The remaining nodes are labeled r through z. In the FIG. 1 network, the sets of nodes b and m are disjoint but, as mentioned above, they do not have to be so. Also, the FIG. 1 network is undirected, but in general the invention works on directed graphs.

The objective is to find a small subset, M, of nodes m from a set of K modes m, such that for each branch node, b, there are two distinct nodes $m_i$ and $m_j$ in M such that no node except b is on both any shortest path from b to $m_i$ (there may be more than one shortest path) and on any shortest path from b to $m_j$ (there may be more than one shortest path). Such a pair $\{m_i, m_j\}$ is said to "cover" b. It is not a requirement of this invention, but it is helpful to think of the node pairs $\{m_i, m_j\}$ as consisting of a first monitoring partner (FP) node and a second monitoring partner (SP) node. If a branch node b is also a potential monitoring node, then the definition of "covering b" is slightly different. Such a node can be covered either by two distinct monitoring nodes, exactly as above, or by itself, and no other monitoring node.

A node b typically has a number of outgoing links. In trying to reach a given other node such as a potential monitoring node, the particular routing algorithm that is employed in the FIG. 1 network specifies the outgoing link from node b that is to be taken. For example, in the case of the OSPF algorithm, the algorithm specifies the route that has the lowest cost, and that route identifies the outgoing link of b that is part of the route. In situations where there is more than one lowest-cost route, the OSPF algorithm may choose one or the other of the routes in accord with some procedure. Also in situations where there is more than one lowest-cost route, it is possible that all of the lowest-cost routes leave the node via one and the same link, or via different links.

To illustrate, from $b_1$ to $m_1$ in FIG. 1 there are two lowest cost routes, one through node y and the other through node z, each with a cost of 9. From $b_4$ to $m_2$ there is only one lowest cost route, via a link that connects directly to node $m_2$, with a cost of 9. From $b_2$ to $m_1$ there are also two lowest cost routes with a cost of 16, but both use link $(b_2, b_1)$—and thence one passes through node y and the other through node z.

In accord with the principles of this invention, a potential monitoring node m, is "good" for node $b_j$ if all of the lowest cost paths from $b_j$ to m depart node $b_j$ via one and the same link.

Additionally, node $b_j$ is considered to be "t-good" if there are at least t potential monitoring nodes that are "good" for $b_j$.

In many experimental runs of the method disclosed herein, t was fixed at one half the number of the potential monitoring nodes i.e., $$t = \left\lfloor \frac{K}{2} \right\rfloor,$$

and the results were quite satisfactory. In some experimental runs a value of t=1 was found to be even better.

Figure 2:
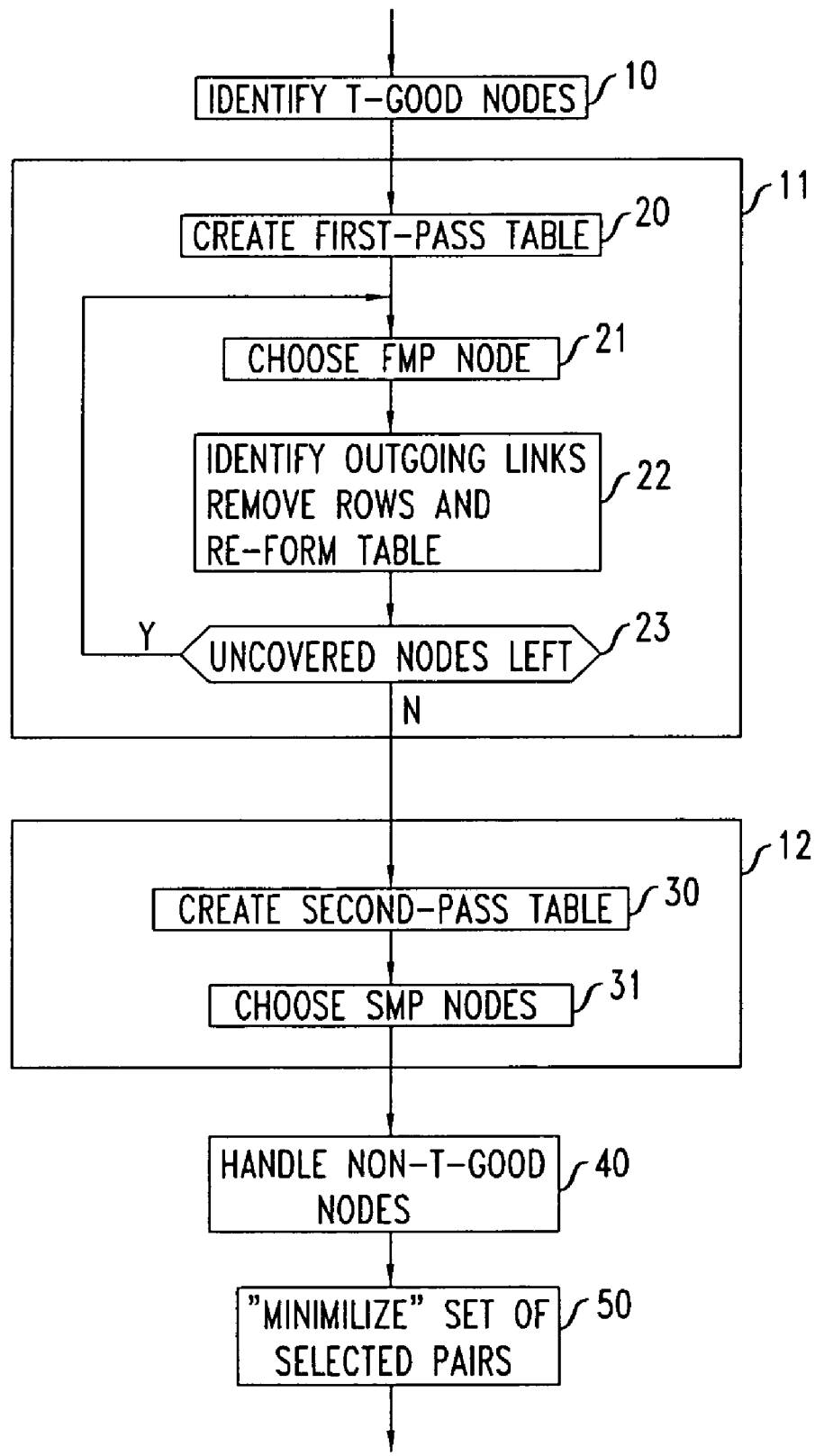
FIG. 2 presents a flow chart of a method in accord with the principles disclosed herein.

FIG. 2 presents a general flow diagram illustrating a method in accord with the principles disclosed herein. In step 10, the set of branch nodes is analyzed to identify the nodes that are t-good, and then control passes to step 20. The nodes that fail to be t-good are set aside and not considered in the following two steps, 11 and 12, where the FP nodes and the SP nodes are selected for the t-good branch nodes, respectively. Each of the algorithms executed in steps 11 and 12 is, basically, a hitting set heuristic.

Step 11 illustratively proceeds by creating a table in step 20 and iteratively executing a process in steps 21-23 to remove the table rows as expeditiously as possible. Specifically, step 20 creates a table with a column for each potential monitoring node (thus, there are K columns), and a row for each one of the "t-good" branch nodes that were identified in step 10. Each cell of a row for node $b_j$ illustratively has a "1" if the corresponding potential monitoring node is "good" for the branch node, and a "0" otherwise. Alternatively, each cell contains the label of the node that is reached first in the lowest-cost path from the branch node to that cell's associated potential monitoring node (or the label of the outgoing link itself). In cases where there is more than one lowest-cost path and their paths use different links incident from node $b_j$, that exit $b_j$ to different nodes, the cell identifies each of the different reached nodes (or the outgoing links).

While for computer execution purposes use of the "0" and "1" is advantageous, for expository purposes the use of the alternative is deemed clearer and, therefore, the table below employs this alternative approach.

For t chosen at $$\left\lfloor \frac{K}{2} \right\rfloor,$$

relative to the FIG. 1 network the table created by step 20 is as shown below. It may be noted that the table identifies two nodes in the cells that correspond to $b_1$ and $m_1$, $b_6$ and $m_1$, and $b_6$ and $m_5$ (these are "0" in the other implementation of the table, and all other cells are "1").

|   | $m_1$ | $m_2$ | $m_3$ | $m_4$ | $m_5$ |
|---|---|---|---|---|---|
| $b_1$ | y, z | $m_2$ | $m_2$ | $m_2$ | $m_5$ |
| $b_2$ | $b_1$ | $b_1$ | x | x | $b_1$ |
| $b_3$ | t | $m_2$ | t | $m_4$ | $m_2$ |
| $b_4$ | s | $m_2$ | $m_2$ | $m_2$ | v |
| $b_5$ | $m_3$ | $m_2$ | $m_3$ | $m_3$ | $m_2$ |
| $b_6$ | w, $m_1$ | $m_3$ | $m_3$ | $m_3$ | w, $m_1$ |

It is not uncommon for some of the branch nodes to be also potential monitoring nodes. If such a branch node is chosen as a monitoring node, whether in the course of executing step 11, or specifically for the purpose of monitoring the node, no second monitoring node is necessary because it can monitor itself. Such nodes can, however, be covered in the usual way by two monitoring nodes. For such a branch node b, the cell corresponding to row b and column b (if b is a potential monitoring node) contains a "1" in the first, binary implementation of the table, and the cell contains the dummy entry b in the second implementation of the table. In the example, if node $b_1$ happened to also be a measuring node $m_6$, aside from the fact that the above table would have another column, the cell corresponding to the $m_6$ column and $b_1$ row would have the entry $b_j$.

After the table is created, control passes to step 21 where a monitoring node is chosen as an FP node. The monitoring node that is chosen is the one that hits the largest number of branch nodes, which in the context of the created table means the column with the largest number of cells that identify a single node. In the case of the table above, nodes $m_1$ and $m_5$ have fewer such cells than nodes $m_2$, $m_3$, and $m_4$ ($m_1$ hits 4 branch nodes and $m_5$ hits 5 branch nodes, whereas $m_2$, $m_3$, and $m_4$ each hit 6 branch nodes) so the algorithm, in this case, chooses one of the three nodes $m_2$, $m_3$, and $m_4$.

In the example, node $m_2$ is chosen at this step as an FP node (though nodes $m_3$ or $m_4$ could have been chosen).

Control then passes to step 22 which identifies the outgoing link of each branch node that is hit by the chosen FP node, removes the rows of the branch nodes that are hit by the chosen node, reforms the table with the remaining rows, and passes control to step 23, which determines whether there are any remaining rows. In the embodiment where the table cells contain the first-reached node, or the outgoing link, the step of identifying the outgoing link is merely recording the values in the cells.

As an aside, what this removal effectively states is that the branch node of a removed row, $b_j$ will be covered by using the chosen monitoring node as the FP node, and some other node that has not yet been chosen as the SP node (excluding, as indicated above, branch nodes that are potential monitoring nodes that are chosen FP nodes). As defined above, a node b (that is not a chosen monitoring node) is said to be covered when there exist two distinct monitoring nodes, $m_i$ and $m_j$ such that all lowest cost paths from node b to node $m_i$ are node-disjoint from all lowest cost paths from node b to node $m_j$ (except for b, of course).

Returning to the algorithm and the FIG. 2 flowchart, if after the removal of rows step 23 determines that un-hit rows still exist (i.e., the reformed table is not empty), control returns to step 21 for choosing another FP node based on the reformed table in accord with the above-described process. When no un-hit rows remain and the table is empty, as is the case for the above example after a single pass through step 21, control passes to step 30.

It is noted that the outgoing links toward the FPs that are identified by step 22 for the above example are $(b_1,m_2)$, $(b_2, b_1)$, $(b_3,m_2)$, $(b_4,m_2)$, $(b_5,m_2)$, and $(b_6,m_3)$, for $b_1$ through $b_6$, respectively.

Having chosen the FP nodes, the next task is to choose the SP nodes and, as indicates above, the task of choosing the SP nodes is executed in step 12, which comprises steps 30 and 31.

Step 30 creates a second-pass table by identifying, for each t-good branch node b, the potential monitoring nodes m such that all least cost paths from b to m do NOT use the outgoing link identified in step 22, for branch node b, and placing a "1"

in cell (b,m), while placing a "0" in all other cells. In addition, if a t-good branch node b is also a potential monitoring node, then in cell (b,b) we place a "1". Control then passes to step 31 which chooses a set of monitoring nodes (i.e., columns) as the SP nodes that, together, hit all of the rows in the table.

It may be noted that in constructing the table of step 30 it is required to not include those rows corresponding to branch nodes that are also FP nodes because they do not need SP nodes for their proper monitoring. They monitor themselves.

In the illustrative example of the FIG. 1 network, node $m_2$ is the sole FP node and it hits all of the nodes $b_1$ through $b_6$, so the resulting table, shown below, has a "0" in the cell corresponding to $b_2$ and $m_5$ because some lowest-cost path from $b_2$ to $m_5$ uses the outgoing link from $b_2$ to $b_1$, which is the outgoing link used by the chosen FP node for node $b_2$. For correspondingly the same reason many of the other cells have a "0."

What the table below indicates is that choosing node $m_1$ hits all but one of the branch nodes while the other potential monitoring nodes hit fewer branch nodes, so step 31 chooses $m_1$ as a SP node, removes the nodes that are hit by the choice of node $m_1$, and observing that the only node that remains un-hit is node $b_2$ and that it is hit by monitoring nodes $m_3$ and $m_4$, step 31 chooses one of these monitoring nodes; for example, node $m_3$, and passes control to step 40.

|  | Outgoing link | $m_1$ | $m_2$ | $m_3$ | $m_4$ | $m_5$ |
|---|---|---|---|---|---|---|
| $b_1$ | $(b_1, m_2)$ | 1 | 0 | 0 | 0 | 1 |
| $b_2$ | $(b_2, b_1)$ | 0 | 0 | 1 | 1 | 0 |
| $b_3$ | $(b_3, m_2)$ | 1 | 0 | 1 | 1 | 0 |
| $b_4$ | $(b_4, m_2)$ | 1 | 0 | 0 | 0 | 1 |
| $b_5$ | $(b_5, m_2)$ | 1 | 0 | 1 | 1 | 0 |
| $b_6$ | $(b_6, m_3)$ | 1 | 0 | 0 | 0 | 1 |

Expressing the process involved in steps 10 and 11 somewhat more mathematically, one needs to determine, for each branch node $b_j$, link $e=(b_j,x)$ leaving $b_j$, and potential monitoring node $m_k$, whether all lowest-cost OSPF paths from $b_j$ to $m_k$ depart $b_j$ via the link $e=(b_j,x)$. All lowest-cost paths from $b_j$ to $m_k$ depart $b_j$ via the link $e=(b_j,x)$ if and only if for all links $(b_j,y)$ $y \neq x$, $cost(b_j,y)+dist(y,m)>cost(b_j,x)+dist(x,m)$, where $dist(x,m)$ stands for the cost of the lowest-cost path from x to m.

Expressing the process involved in step 12 somewhat more mathematically, one needs to determine, for each branch node $b_j$, link $e=(b_j,x)$ leaving $b_j$, and potential monitoring node $m_k$, whether all lowest-cost OSPF paths from $b_j$ to $m_k$ avoid link e. All lowest-cost OSPF paths from $b_j$ to $m_k$ avoid link $e=(b_j,x)$ if and only if $cost(b_j,x)+dist(x, m_k)>dist(b_j, m_k)$.

Defining $S_{jk}$ as the set of all nodes x on some shortest $b_j$-to-$m_k$ path, $S_{jk}$ can be computed for all branch nodes $b_j$ and monitoring nodes $m_k$, and then the pair $\{m_k,m_n\}$ of monitoring nodes covers $b_j$ (which is not a potential monitoring node) if and only if $m_k$ and $m_n$ are two distinct potential monitoring nodes and the intersection of $S_{jk}$ and $S_{jn}$ is a set that contains only branch node $b_j$. As an aside, a node x belongs to $S_{jk}$ if and only if $dist(b_j,x)+dist(x,m_k)=dist(b_j, m_k)$.

As indicated above, the method steps disclosed above do not handle the nodes that are not "t-good" ("t-bad" for short). It is the function of step 40 to handle those nodes, but if no such nodes exist then, of course, control passes to the next step, which is step 50.

There are different approaches that can be taken for handling these "t-bad" nodes in step 40. One such approach is a "greedy" algorithm where one of the remaining potential monitoring nodes (RPM nodes) is considered, and the network is analyzed to determine how many of the "t-bad" nodes can be covered by choosing that node. In the above example, the RPM nodes are nodes $m_4$ and $m_5$—because node $m_2$ was chosen as a FP node and nodes $m_1$ and $m_3$ were chosen as SP nodes. The analysis is repeated, each time for a different chosen RPM node, until all of the RPM nodes have been considered. Then one of the RPM nodes is chosen that, together with the already chosen potential monitoring nodes (an FP, SP, or a previously chosen RPM) covers the largest number of the "t-bad" nodes. That chosen RPM node is removed from the RPM node set.

Once an RPM node is chosen, step 40 determines whether any "t-bad" nodes still remain that are not covered. If so, the steps involving choosing the RPM nodes one at a time, determining how many uncovered "t-bad" nodes can be covered, and choosing an RPM node that covers the largest number of uncovered "t-bad" nodes, are repeated, until no uncovered "t-bad" nodes remain.

It is possible that the addition of no single added RPM will cover any "t-bad" node. A different chosen order might result in more complete coverage of the "t-bad" nodes, or perhaps even a complete coverage, so such a different order might be tried. Alternatively, the RPM nodes are considered in pairs.

Trying all possible pairs is guaranteed to yield coverage of the t-bad nodes because if a feasible solution is possible, it can always be found by trying all possible pairs of nodes. (In a feasible solution, every branch node b can be covered by choosing either some pair of distinct potential monitoring nodes or, if b is also a potential monitoring node, by choosing b itself.) Of course, the pair that is best to choose is the one that hits the largest number of remaining RPM nodes.

Step 50 takes into account the fact that the choices made for the FP nodes and SP nodes and RPM nodes are sufficient to cover all of the branch nodes (i.e., presenting a feasible solution), but it is not necessarily a minimal set for covering all of the branch nodes. That is, the entire set of chosen potential monitoring nodes (chosen FP nodes, SP nodes, and RPM nodes) might be reduced, and optional step 50 "minimalizes" this set. Illustratively, step 50 takes each of the monitoring nodes, temporarily removes it from the set and determines whether each of the branch nodes is still covered by a pair of monitoring nodes. If so, the temporarily removed node is removed permanently. If not, the temporarily removed node is returned to the set. This operation is performed on each of the chosen monitoring nodes.

It may be noted that if the considered network is such that at least one feasible solution exists, then the method disclosed herein will find one such feasible solution; and experimental results indicate that the method disclosed herein yields a feasible solution that is quite close to optimum, and within a reasonable processing time.

The invention claimed is:

1. A method executed in one or more processing modules for identifying a set of type-A nodes from a set of nodes m of a network having a working association with a set B of nodes b of said network, said nodes m are nodes that are not precluded from installing a processing module of said processing modules, hereinafter also referred to as potential type-A nodes, comprising the steps of:

identifying a subset T of nodes b that are t-good, where a node $m_k$ is good for node $b_j$ if all lowest-cost paths from node $b_j$ to node $m_k$ leave node $b_j$ on one and the same link, and node $b_j$ is t-good if at least t of the potential type-A nodes are good for $b_j$, where t is a preselected positive integer not greater than the number of said potential type-A nodes;

then, choosing a subset of said potential type-A nodes as type-A nodes, such that that for each t-good node b in T, at least one node of the type-A nodes is good for node b;

then, choosing zero or more additional ones of said potential type-A nodes as type-A nodes to cause a pair of two distinct type-A nodes $m_i$ and $m_j$ to exist for each t-good node b in T that is not also a type-A node, such that no node other than node b is on any lowest-cost path from b to $m_i$ and on any lowest-cost path from b to $m_j$;

then, if there are nodes b in B that are not t-good, choosing zero or more additional ones of said potential type-A nodes as type-A nodes to provide, for each node $b_p$ in B that is not t-good, (a) one type-A node if said node $b_p$ in B that is not t-good is also a potential type-A node, or (b) a pair of type-A nodes, $m_i$ and $m_j$, such that no node other than said node $b_p$ is on any lowest-cost path from $b_p$ to $m_i$ and on any lowest-cost path from $b_p$ to $m_j$.

2. The method of claim 1 where said type-A nodes are monitoring nodes, and said nodes b are nodes to be monitored.

3. The method of claim 1 further comprising a step of minimizing the set of those of said potential type-A nodes that were chosen as type-A nodes.

4. A method executed in one or more processing modules for choosing nodes from a given set M of network nodes, where nodes in said set M are not precluded from installing a processing module of said processing modules and where the chosen nodes have a specified working relationship with nodes b from a set B of said network nodes, referred to herein as branch nodes, comprising the steps of:

identifying a subset T of branch nodes, $b^T$, that satisfy a preselected criterion;

choosing, by means of a first algorithm, for each node $b^T$, a pair of nodes from set M consisting of a first partner (FP) nodes and a second partner (SP) node, such that all shortest paths from said each node $b^T$, to the chosen FP node are disjoint from all shortest paths from said each node $b^T$, to the chosen SP node;

selecting, by means of a second algorithm that is qualitatively different from the first algorithm, for each of said branch nodes that are not in subset T, $\bar{b}^T$ a pair of nodes from set M consisting of a first partner (FP) node and a second partner (SP) node, such that that all shortest paths from said each node $\bar{b}^T$, to the selected FP node are disjoint from all shortest paths from said each node $\bar{b}^T$, to the selected SP node.

5. The method of claim 4 where the first algorithm is a hitting set heuristic.

6. The method of claim 4 where said hitting set heuristic comprises a process for identifying nodes b that belong to subset T.

7. The method of claim 4 where said process for identifying said nodes b that belong to subset T is one where a branch node $b_j$ belongs to set T if it is t-good, said branch node $b_j$ is t-good when it is good for at least t nodes in set M, where t is a preselected scalar, and said branch node $b_j$ is good for node $m_k$ in set M if all lowest-cost paths from node $b_j$ to node $m_k$ leave node $b_j$ on one and the same link.

8. The method of claim 7 where said first algorithm comprises a first process for choosing the FP nodes and a second process for choosing the SP nodes.

9. The method of claim 8 where the first process comprises the steps of:

populating cells of a table having two dimensions, where a first dimension is rows of said table and the second dimension is columns of said table, where said branch nodes in subset T correspond to one dimension of the table and the nodes in set M are the second dimension of the table, by placing in a cell a 1 if the branch node that is associated with the cell is good for the set-M node that is associated with the cell;

identifying one or more of said set-M nodes that each has a largest number of associated cells that contain a 1;

selecting one of the set-M nodes identified in said step of identifying as said FP node and identifying nodes that are hit by the selected FP node, identified by a 1 in column of cells corresponding to the selected FP node;

for each branch node that is hit by a selected FP node, identifying an outgoing link from said each branch node on its least-cost path toward said selected FP node, and removing said branch node from said table;

returning to said step of identifying when said table is not empty, and terminating said first process otherwise.

10. The method of claim 8 where a branch node that is also a set-M node is treated as being good for said set-M node.

11. The method of claim 10 where, when said step of identifying set-M nodes identifies more than one of said set-M nodes, and one of the identified node is a branch node, the step of selecting then selects as said FP node the set-M node that is also a branch node.

12. The method of claim 7 where said first process comprises the steps of:

populating cells of a table having two dimensions, where a first dimension is rows of said table and the second dimension is columns of said table, where said branch nodes in subset T correspond to one dimension of the table and the set-M nodes are the other dimension of the table, by placing in each cell corresponding to branch node $b_i$ and set-M node $m_j$ the identity of outgoing link of each lowest-cost path from $b_i$ to $m_j$;

identifying one or more of said set-M nodes that each has a largest number of associated cells that contain a single entry;

selecting one of the set-M nodes identified in said step of identifying as FP node and identifying nodes that are hit by the selected FP node, identified by a single outgoing link entry in the cells in column of cells corresponding to the selected FP node;

for each branch node that is hit by the selected FP node, identifying outgoing link from said each branch node on its least-cost path toward said FP node, and removing said branch node from said table;

returning to said step of identifying when said table is not empty, and terminating said first process otherwise.

13. The method of claim 7 where said second process comprises the steps of:

populating cells of a table having two dimensions, where a first dimension is rows of said table and the second dimension is columns of said table, where said branch nodes in set T, less those of said branch nodes that are also FP nodes correspond to one dimension of the table and the set-M nodes are the other dimension of the table, by placing a 1 in a cell if the branch node that is associated with the cell and the set-M node that is associated with the cell are such that all least cost paths from the branch node that is associated with the cell to the set-M node associated with the cell do not use the identified outgoing link;

identifying one or more of said set-M nodes that each has a largest number of associated cells that contain a 1;

selecting one of the set-M nodes identified in said step of identifying as SP node;

removing from said table those branch nodes that are hit by the selected SP node;

returning to said step of identifying when said table is not empty, and terminating said second process otherwise.

14. The method of claim 5 where the second algorithm is a greedy algorithm.

15. The method of claim 7 where t=1.

16. The method of claim 7 where $$t = \left\lfloor \frac{K}{2} \right\rfloor,$$

where K is number of nodes in set M.

17. The method of claim 7 where t is an integer portion of a preselected fraction of number of said set-M nodes.

* * * * *